United States Patent Office 3,658,829
Patented Apr. 25, 1972

3,658,829
PHENOXY CARBOXYLIC ACID DERIVATIVES
Yasushi Nakamura, Ibaragi-shi, Kunio Agatsuma and Yoshihiro Tanaka, Takarazuka-shi, and Shunji Aono, Toyonaka-shi, Japan, assignors to Sumitomo Chemical Company, Ltd., Osaka, Japan
No Drawing. Filed July 27, 1970, Ser. No. 58,743
Claims priority, application Japan, Aug. 1, 1969, 44/61,164; Aug. 8, 1969, 44/61,871; Sept. 24, 1969, 44/76,516, 44/76,517
Int. Cl. C07d 85/48, 91/44
U.S. Cl. 260—304
7 Claims

ABSTRACT OF THE DISCLOSURE

Novel anti-atherosclerosis agents of the formula,

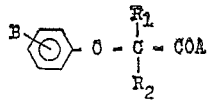

wherein $R_1$ and $R_2$ each is hydrogen or lower alkyl, A is hydroxyl or alkoxy; and B is cycloalkenyl, 2-benzothiazolyl or 2-benzoxazolyl.

These compounds are prepared by reacting a phenol derivative of the formula,

with chloroform and a carbonyl compound of the formula, $$R_1-CO-R_2$$

in the presence of an alkali. Alternatively, they are produced by reacting the phenol derivative with a carboxylic acid derivative of the formula,

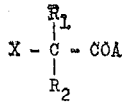

wherein A, B, $R_1$ and $R_2$ are the same as defined above and X is halogen or hydroxyl, and if necessary, esterifying or hydrolyzing the resulting condensation product.

This invention relates to novel anti-atherosclerosis agents. More particularly, the invention pertains to novel substituted phenoxycarboxylic acid derivatives which are useful for lowering the elevated levels of cholesterol or lipids.

Atherosclerosis is an adult disease for which there is no known satisfactory cure. Although the cause for atherosclerosis is not yet known in spite of discussions in the academic circles, it has broadly been recognized that one of the most significant histo-pathological manifestations of atherosclerosis is the deposition of cholesterol or lipids in the blood.

A number of experimental and clinical facts have been reported, which indicate the reduction of the elevated blood cholesterol or lipid level is considered extremely important for the prevention of atherosclerosis.

The present inventors have found a group of novel compounds which are effective as chloesterol-lowering agents and which are substantially nontoxic.

An object of the present invention is to provide substituted phenoxycarboxylic acid derivatives usable as anti-atherosclerosis agents which have prominent effects and extremely high in admissibility.

Another object of the invention is to provide an economical and industrially advantageous process for producing the above-mentioned substituted phenoxycarboxylic acid derivatives.

A further object of the invention is to provide a pharmaceutical composition containing such anti-atherosclerosis agent.

Other objects and merits of the invention will be apparent from the following description.

In order to accomplish these objects, the present invention provides novel substituted phenoxycarboxylic acid derivatives of the formula,

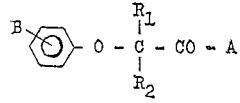

(I)

wherein $R_1$ and $R_2$ represent individually hydrogen or lower alkyl; A represents hydroxyl or alkoxy; and B represents cycloalkenyl, 2-benzothiazolyl or 2-benzoxazolyl and pharmaceutically acceptable salts thereof.

The present invention further provides a process for producing substituted phenoxycarboxylic acid derivatives represented by the Formula I, which comprises reacting a phenol derivative of the formula,

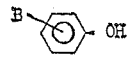

(II)

wherein B is the same as defined above, with chloroform and a carbonyl compound of the formula, $$R_1-CO-R_2 \qquad (III)$$

wherein $R_1$ and $R_2$ are the same as defined above, in the presence of an alkali to yield the substituted phenoxycarboxylic acid derivative of the Formula I in which A is hydroxyl, or reacting a phenol derivative of the formula,

(II)

wherein B is the same as defined above, with a carboxylic acid derivative of the formula,

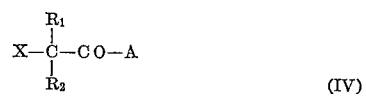

(IV)

wherein $R_1$, $R_2$ and A are the same as defined above; and X is hydroxyl or halogen, to yield the substituted phenoxycarboxylic acid derivative of the Formula I, and then, if necessary, esterifying or hydrolyzing the resultant substituted phenoxycarboxylic acid derivative to yield a corresponding ester or free acid.

The present invention furthermore provides a cholesterol lowering composition containing as an active ingredient substituted phenoxycarboxylic acid derivative of the Formula I or pharmaceutically acceptable salt thereof.

All the compounds involved in the present invention are novel compounds which have first been synthesized by the present inventors.

In the present invention, examples of the lower alkyl of $R_1$ and $R_2$ include methyl, ethyl, n- or i-propyl and n-, i- or t-butyl, and examples of the alkoxy of A include methoxy, ethoxy, n- or i-propoxy and n-, i- or t-butoxy. The cycloalkenyl of B means of 5- or 6-membered cycloalkenyl having one carbon-carbon double bond at the optional position in the ring.

The substituted phenoxycarboxylic acid derivatives of the Formula I of the present invention can be produced by reacting a phenol derivative of the Formula II with chloroform and a carbonyl compound of the Formula III in the presence of an alkali, and then, if necessary, esterifying the resultant substituted phenoxycarboxylic acid. In order to carry out this reaction, at least 1 mole of chloroform is added dropwise into a mixture containing 1 mole of the phenol derivative of the Formula II and at least 1 mole of the carbonyl compound of the Formula III in the presence of at least 3 moles of the alkali. Examples of the alkali used include sodium hydroxide and potassium hydroxde. The reaction requires a temperature of 20°–150° C. and a period of time of 0.5–40 hours. The reaction may be carried out in the presence or absence of an inert reaction medium or in the presence of an excess of chloroform and/or the carbonyl compound of the Formula III. Examples of the inert reaction medium include dioxane, benzene, toluene, etc.

The substituted phenoxycarboxylic acid derivatives of the Formula I can be, if necessary, esterified by a conventional esterification method, for example, by the reaction with an alcohol, diazomethane, a dialkyl sulfate, an alkyl halide, an alkylhalogenosulfite, etc.

Alternatively, in the present invention, the substituted phenoxycarboxylic acid derivatives of the Formula I can be prepared by reacting a phenol derivative of the Formula II with a carboxylic acid derivative of the Formula IV.

The process of the present invention is explained in further detail below.

In case X in the Formula IV represents a halogen atom such as chlorine, bromine or iodine, there is adopted the following procedure:

The phenol derivative of the Formula II is suspended or dissolved in an inert solvent such as benzene, toluene or alcohol, and then treated with a suitable basic compound such as alkali metal hydroxide, alkali metal alcoholate, metallic alkali metal, alkali metal hydride, organic tertiary amine such as pyridine or trialkylamine, alkali metal carbonate or the like. Thereafter, the carboxylic acid derivative of the Formula IV is added dropwise into the mixture. The reaction requires a temperature of 10°–150° C. and a period of time of 0.5–10 hours. Subsequently, the reaction product is subjected to ordinary aftertreatment, and the resulting crude product is purified.

In case X in the Formula IV represent hydroxyl, such an acid catalyst as sulfuric acid, p-toluenesulfonyl chloride or the like is used, whereby a desired acid or ester derivative can be obtained.

If the product obtained is an acid (i.e. A in the Formula I is a hydroxyl group), it may be converted into an ester of the Formula I in which A is an alkoxy group as described above. On the other hand if the product is an ester of the Formula I in which A is an alkoxy group, the ester may further be subjected to ordinary hydrolysis with alkali or acid to obtain an acid of the Formula I in which A is a hydroxyl group, or a salt thereof.

In the present invention, the substituted phenoxycarboxylic acid derivative of the Formula I in which A is hydroxyl may be converted into an alkali metal or ammonium salt by a usual salt formation method, for example, by treating the acid with an aqueous solution of alkali metal hydroxide, alkali metal carbonate, alkali metal bicarbonate or ammonia; or by treating the acid with an alkali metal alcoholate in an organic solvent, preferably in a lower alcohol such as methanol or ethanol; or by treating the acid with hydroxide, carbonate or bicarbonate of alkali metal, in an organic solvent, preferably in acetone or methanol, if necessary, in the presence of a small amount of water. The thus obtained alkali metal salt may be further converted into an alkaline earth metal salt by further treatment with calcium chloride or the like alkaline earth metal.

Most of the salts obtained in the above manner are water-soluble. The water-soluble salts may be recovered by washing an aqueous solution of the salts with an organic solvent and then charging into a water-soluble polar solvent in which the desired salts is insoluble, or alternatively distilling off water from the aqueous solution of the salts by a suitable means such as spray dryer or the like.

Thus the desired salts can be obtained in the form of powder.

In case the salts obtained are slightly water-soluble, the salts may be recovered by filtration and then washed and purified with an organic solvent such as ether or benzene.

In case it is difficult to purify the substituted phenoxycarboxylic acid derivative of the Formula I in which A is a hydroxyl group by recrystallization or the like procedure, the acid is purified after esterification by the column chromatography method, whereby the ester can be purified easily. The ester thus purified is then hydrolyzed to obtain a desired acid in high purity.

The phenol derivatives represented by the Formula II which are used in the present process can be obtained easily according to an ordinary known process, i.e. a process in which a cycloalkyldiene is condensed with phenol in the presence of such an acid catalyst as sulfuric or phosphoric acid, or according to the process disclosed in J.A.C.S., 75, 5967 (1953), or J.A.C.S. 48, 783 (1926).

Specific examples of the compounds involved in the scope of the present invention are as follows:

o-, m- or p-(1-cyclopentenyl)phenoxyisobutyric acid
o-, m- or p-(2-cyclopentenyl)phenoxyisobutyric acid
o-, m- or p-(3-cyclopentenyl)phenoxyisobutyric acid
o-, m- or p-(1-cyclohexenyl)phenoxyisobutyric acid
o-, m- or p-(2-cyclohexenyl)phenoxyisobutyric acid
o-, m- or p-(3-cyclohexenyl)phenoxyisobutyric acid
$\alpha$-[o-, m- or p-(1-cyclopentenyl)phenoxy]-$\alpha$-methylbutyric acid
$\alpha$-[o-, m- or p-(2-cyclopentenyl)phenoxy]-$\alpha$-methylbutyric acid
$\alpha$-[o-, m- or p-(3-cyclopentenyl)phenoxy]-$\alpha$-methylbutyric acid
$\alpha$-[o-, m- or p-(1-cyclohexenyl)phenoxy]-$\alpha$-methylbutyric acid
$\alpha$-[o-, m- or p-(2-cyclohexenyl)phenoxy]-$\alpha$-methylbutyric acid
$\alpha$-[o-, m- or p-(3-cyclohexenyl)phenoxy]-$\alpha$-methylbutyric acid
$\alpha$-[o-, m- or p-(1-cyclopentenyl)phenoxy]-$\alpha$-ethylbutyric acid
$\alpha$-[o-, m- or p-(2-cyclopentenyl)phenoxy]-$\alpha$-ethylbutyric acid
$\alpha$-[o-, m- or p-(3-cyclopentenyl)phenoxy]-$\alpha$-ethylbutyric acid
$\alpha$-[o-, m- or p-(1-cyclohexenyl)phenoxy]-$\alpha$-ethylbutyric acid
$\alpha$-[o-, m- or p-(2-cyclohexenyl)phenoxy]-$\alpha$-ethylbutyric acid
$\alpha$-[o-, m- or p-(3-cyclohexenyl)phenoxy]-$\alpha$-ethylbutyric acid
$\alpha$-[o-, m- or p-(1-cyclopentenyl)phenoxy]-$\alpha$-methylvaleric acid
$\alpha$-[o-, m- or p-(2-cyclopentenyl)phenoxy]-$\alpha$-methylvaleric acid
$\alpha$-[o-, m- or p-(3-cyclopentenyl)phenoxy]-$\alpha$-methylvaleric acid
$\alpha$-[o-, m- or p-(1-cyclohexenyl)phenoxy]-$\alpha$-methylvaleric acid
$\alpha$-[o-, m- or p-(2-cyclohexenyl)phenoxy]-$\alpha$-methylvaleric acid
$\alpha$-[o-, m- or p-(3-cyclohexenyl)phenoxy]-$\alpha$-methylvaleric acid
$\alpha$-[o-, m- or p-(1-cyclopentenyl)phenoxy]-$\alpha$-ethylvaleric acid
$\alpha$-[o-, m- or p-(2-cyclopentenyl)phenoxy]-$\alpha$-ethylvaleric acid
$\alpha$-[o-, m- or p-(3-cyclopentenyl)phenoxy]-$\alpha$-ethylvaleric acid
$\alpha$-[o-, m- or p-(1-cyclohexenyl)phenoxy]-$\alpha$-ethylvaleric acid
$\alpha$-[o-, m- or p-(2-cyclohexenyl)phenoxy]-$\alpha$-ethylvaleric acid α-[o-, m- or p-(3-cyclohexenyl)phenoxy]-α-ethylvaleric acid
α-[o-, m- or p-(1-cyclopentenyl)phenoxy]-α,β-dimethylbutyric acid
α-[o-, m- or p-(2-cyclopentenyl)phenoxy]-α,β-dimethylbutyric acid
α-[o-, m- or p-(3-cyclopentenyl)phenoxy]-α,β-dimethylbutyric acid
α-[o-, m- or p-(1-cyclohexenyl)phenoxy]-α,β-dimethylbutyric acid
α-[o-, m- or p-(2-cyclohexenyl)phenoxy]-α,β-dimethylbutyric acid
α-[o-, m- or p-(3-cyclohexenyl)phenoxy]-α,β-dimethylbutyric acid
o-, m- or p-(1-cyclopentenyl)phenoxyacetic acid
o-, m- or p-(2-cyclopentenyl)phenoxyacetic acid
o-, m- or p-(3-cyclopentenyl)phenoxyacetic acid
o-, m- or (p-1-cyclohexenyl)phenoxyacetic acid
o-, m- or p-(2-cyclohexenyl)phenoxyacetic acid
o-, m- or p-(3-cyclohexenyl)phenoxyacetic acid
α-[o-, m- or p-(1-cyclopentenyl)phenoxy]propionic acid
α-[o-, m- or p-(2-cyclopentenyl)phenoxy]propionic acid
α-[o-, m- or p-(3-cyclopentenyl)phenoxy]propionic acid
α-[o-, m- or p-(1-cyclohexenyl)phenoxy]propionic acid
α-[o-, m- or p-(2-cyclohexenyl)phenoxy]propionic acid
α-[o-, m- or p-(3-cyclohexenyl)phenoxy]propionic acid
α-[o-, m- or p-(1-cyclopentenyl)phenoxy]-α-ethyl-β-methylbutyric acid
α-[o-, m- or p-(2-cyclopentenyl)phenoxy]-α-ethyl-β-methylbutyric acid
α-[o-, m- or p-(3-cyclopentenyl)phenoxy]-α-ethyl-β-methylbutyric acid
α-[o-, m- or p-(1-cyclohexenyl)phenoxy]-α-ethyl-β-methylbutyric acid
α-[o-, m- or p-(2-cyclohexenyl)phenoxy]-α-ethyl-β-methylbutyric acid
α-[o-, m- or p-(3-cyclohexenyl)phenoxy]-α-ethyl-β-methylbutyric acid
α-[o-, m- or p-(1-cyclopentenyl)phenoxy]-α-propylvaleric acid
α-[o-, m- or p-(2-cyclopentenyl)phenoxy]-α-isopropyl-β-methylbutyric acid
α-[o-, m- or p-(3-cyclopentenyl)phenoxy]-β,β-dimethylbutyric acid
α-[o-, m- or p-(1-cyclohexenyl)phenoxy]-α-methyl-β,β-dimethylbutyric acid
α-[o-, m- or p-(2-cyclohexenyl)phenoxy]-α-t-butylbutyric acid
2-(2'-benzothiazolyl)phenoxyacetic acid
α-[2-(2'-benzothiazolyl)phenoxy]propionic acid
α-[2-(2'-benzothiazolyl)phenoxy]butyric acid
2-(2'-benzothiazolyl)phenoxyisobutyric acid
α-[2-(2'-benzothiazolyl)phenoxy]-α-methylbutyric acid
α-[2-(2'-benzothiazolyl)phenoxy]-α-ethylbutyric acid
3-(2'-benzothiazolyl)phenoxybutyric acid
α-[3-(2'-benzothiazolyl)phenoxy]propionic acid
α-[3-(2'-benzothiazolyl)phenoxy]butyric acid
3-(2'-benzothiazolyl)phenoxyisobutyric acid
α-[3-(2'-benzothiazolyl)phenoxy]-α-methylbutyric acid
α-[3-(2'-benzothiazolyl)phenoxy]-α-ethylbutyric acid
4-(2'-benzothiazolyl)phenoxyacetic acid
α-[4-(2'-benzothiazolyl)phenoxy]propionic acid
α-[4-(2'-benzothiazolyl)phenoxy]butyric acid
4-(2'-benzothiazolyl)phenoxyisobutyric acid
α-[4-(2'-benzothiazolyl)phenoxy]-α-methylbutyric acid
α-[4-(2'-benzothiazolyl)phenoxy]-α-ethylbutyric acid
2-(2'-benzoxazolyl)phenoxyacetic acid
α-[2-(2'-benzoxazolyl)phenoxy]propionic acid
2-(2'-benzoxazolyl)phenoxyisobutyric acid
α-[2-(2'-benzoxazolyl)phenoxy]butyric acid
α-[2-(2'-benzoxazolyl)phenoxy]-α-methylbutyric acid
α-[2-(2'-benzoxazolyl)phenoxy]-α-ethylbutyric acid
3-(2'-benzoxazolyl)phenoxyacetic acid
α-[3-(2'-benzoxazolyl)phenoxy]propionic acid
α-[3-(2'-benzoxazolyl)phenoxy]butyric acid
[3-(2'-benzoxazolyl)phenoxy]isobutyric acid
α-[3-(2'-benzoxazolyl)phenoxy]-α-methylbutyric acid
α-[3-(2'-benzoxazolyl)phenoxy]-α-ethylbutyric acid
4-(2'-benzoxazolyl)phenoxyacetic acid
α-[4-(2'-benzoxazolyl)phenoxy]propionic acid
α-[4-(2'-benzoxazolyl)phenoxy]butyric acid
4-(2'-benzoxazolyl)phenoxyisobutyric acid
α-[4-(2'-benzoxazolyl)phenoxy]-α-methylbutyric acid
α-[4-(2'-benzoxazolyl)phenoxy]-α-ethylbutyric acid
α-[2-(2'-benzothiazolyl)-phenoxy]valeric acid
α-[3-(2'-benzothiazolyl)phenoxy]valeric acid
α-[2-(2'-benzothiazolyl)phenoxy]-α-methylvaleric acid
α-[3-(2'-benzothiazolyl)phenoxy]-α-methylvaleric acid
α-[4-(2'-benzothiazolyl)phenoxy]-α-methylvaleric acid
α-[2-(2'-benzothiazolyl)phenoxy]-β-methylbutyric acid
α-[4-(2'-benzothiazolyl)phenoxy]-β-methylbutyric acid
α-[2-(2'-benzothiazolyl)phenoxy]-α,β-dimethylbutyric acid
α-[4-(2'-benzothiazolyl)phenoxy]-α,β-dimethylbutyric acid
α-[2-(2'-benzothiazolyl)phenoxy]-α-ethyl-β-methylbutyric acid
α-[4-(2'-benzothiazolyl)phenoxy]-α-ethyl-β-methylbutyric acid
α-[2-(2'-benzothiazolyl)phenoxy]-α-propyl-β-methylbutyric acid
α-[4-(2'-benzothiazolyl)phenoxy]-α-propyl-β-methylbutyric acid
α-[2-(2'-benzothiazolyl)phenoxy]-α-isopropyl-β-methylbutyric acid
α-[3-(2'-benzothiazolyl)phenoxy]-α-isopropyl-β-methylbutyric acid
α-[4-(2'-benzothiazolyl)phenoxy]-α-isopropyl-β-methylbutyric acid
α-[2-(2'-benzothiazolyl)phenoxy]-β-dimethylbutyric acid
α-[4-(2'-benzothiazolyl)phenoxy]-β-dimethylbutyric acid
α-[2-(2'-benzothiazolyl)phenoxy]-α-methyl-β-dimethylbutyric acid
α-[4-(2'benzothiazolyl)phenoxy]-α-methyl-β-dimethylbutyric acid
α-[2-(2'-benzothiazolyl)phenoxy]-α-ethyl-β-dimethylbutyric acid
α-[4-(2'-benzothiazolyl)phenoxy]-α-propyl-β-dimethylbutyric acid
α-[2-(2'-benzothiazolyl)phenoxy]-α-isopropyl-β-dimethylbutyric acid
α-[4-(2'-benzothiazolyl)phenoxy]-α-t-butyl-β-dimethylbutyric acid
α-[2-(2'-benzothiazolyl)phenoxy]caproic acid
α-[4-(2'-benzothiazolyl)phenoxy]-α-methylcaproic acid
α-[3-(2'-benzothiazolyl)phenoxy]-α-ethylcaproic acid
α-[4-(2'-benzothiazolyl)phenoxy]-γ-methylvaleric acid
α-[2-(2'-benzothiazolyl)phenoxy]-γ-methylvaleric acid
Methyl esters of the above-mentioned acids
Ethyl esters of the above-mentioned acids
n-Propyl esters of the above-mentioned acids
i-Propyl esters of the above-mentioned acids
n-Butyl esters of the above-mentioned acids
i-Butyl esters of the above-mentioned acids
t-Butyl esters of the above-mentioned acids
Na salts of the above-mentioned acids
K salts of the above-mentioned acids
Ca salts of the above-mentioned acids
Mg salts of the above-mentioned acids
Al salts of the above-mentioned acids
NH₄ salts of the above-mnetioned acids The process of the present invention is illustrated in more detail by the following examples, but it is not intended to limit the invention to them.

EXAMPLE 1

Into a mixture of 5 g. of p-(2-cyclopentenyl)phenol and 50 g. of acetone was added 7.7 g. of sodium hydroxide.

Then 10 g. of chloroform was added dropwise into the mixture with stirring at 30°–35° C., and the mixture was heated to reflux for 13.5 hours to complete the reaction. Thereafter the solvents were distilled off while adding water to the mixture. The resultant mixture was acidified with diluted hydrochloric acid to obtain 2.4 g. of p-(2-cyclopentenyl)-phenoxyisobutyric acid.

Melting point: 69°–72° C.

*Elementary analysis.*—Calculated (percent): C, 73.14; H, 7.37. Found (percent): C, 73.35; H, 7.22.

EXAMPLES 2–8

According to a procedure similar to that disclosed in Example 1, the following compounds were obtained as shown in Table 1.

EXAMPLE 9

Into a mixture of 5 g. of p-(2-cyclohexenyl)-phenol and 50 ml. of dried toluene was added 3 g. of 50% sodium hydride in oil. Then 21.6 g. of ethyl 2-bromoisobutyrate dissolved in toluene was gradually added dropwise into the mixture with stirring. The mixture was heated at 50°–60° C. for 1 hour.

Thereafter toluene was distilled off. The residue was purified in chromatography column packed with activated alumina and eluted first with n-hexane, then with n-hexane-benzene mixtures of decreasing ratios of n-hexane to benzene and finally with benzene to obtain 2.3 g. of ethyl p-(2-cyclohexenyl)-phenoxy-isobutyrate. Refractive index: $n_D^{24}$: 1.5161.

*Elementary analysis.*—Calculated (percent): C, 74.97; H, 8.39. Found (percent): C, 74.73; H, 8.21.

According to a method similar to that disclosed in Example 9, the following products were obtained.

EXAMPLE 10

Ethyl o-(2-cyclohexenyl)-phenoxyisobutyrate

Refractive index: $n_D^{22}$ 1.5110.

*Elementary analysis.*—Calculated (percent): C, 74.97; H, 8.39. Found (percent): C, 74.75; H, 8.16.

According to a method similar to that disclosed in Example 9, the following products were obtained.

EXAMPLE 11

Ethyl 2-(2'-benzothiazolyl)-phenoxyisobutyrate

Melting point: 51°–54° C.

*Elementary analysis.*—Calculated (percent): C, 66.86; H, 5.57; N, 4.11; S, 9.38. Found (percent): C, 66.45; H, 5.66; N, 4.50; S, 9.24.

EXAMPLE 12

3.2 g. of p-(2-cyclopentyl)-phenoxyisobutyric acid was dissolved in 30 ml. of 99% ethanol and 20 ml. of benzene. Two drops of sulfuric acid was added into the mixture. While by-produced water was distilled off together with the solvents, the reaction mixture was heated for 13 hours. During the heating, adequate amounts of the solvents were added. After the completion of the reaction, water was further added and the solvents were distilled off and the resultant residue was extracted with ether. The ether layer was washed with water and dried over anhydrous sodium sulfate and the ether was distilled off. The residue was purified in column chromatography packed with activated alumina and 2.0 g. of ethyl p-(2-cyclopentyl)-phenoxyisobutyrate was obtained.

Refractive index: $n_D^{24.5}$: 1.5132.

*Elementary analysis.*—Calculated (percent): C, 74.42; H, 8.08. Found (percent): C, 74.46; H, 7.92.

EXAMPLE 13

According to a method similar to that of Example 12, 0.7 g. of ethyl o-(2-cyclohexenyl)-phenoxy-isobutyrate was obtained from 1.7 g. of o-(2-cyclohexenyl)-phenoxyisobutyric acid.

Refractive index: $n_D^{23.5}$: 1.5108.

*Elementary analysis.*—Calculated (percent): C, 74.97; H, 8.39. Found (percent): C, 74.77; H, 8.25.

EXAMPLES 14–18

According to a method similar to that of Example 12, the following compounds were obtained as shown in Table 2.

TABLE 1

| Example No. | Starting materials | | | | Products | | | | | | | | |
|---|---|---|---|---|---|---|---|---|---|---|---|---|---|
| | Phenol derivative | R¹—CO—R² | NaOH or KOH | CHCl₃ [temp.] | Reaction time (temp.) | Phenoxycarboxylic acid | Physical properties | Elementary analysis, percent | | | | | |
| | | | | | | | | Calcd. | | | | Found | |
| | | | | | | | | C | H | N | S | C | H | N | S |
| 2 | p-(1-cyclohexenyl)-phenol (0.65 g.) | CH₃COCH₃ (20 g.) | NaOH (2.7 g.) | 2 g. [30°–35° C.] | 12 hrs. (reflux) | p-(1-cyclohexenyl)-phenoxyisobutyric acid (0.5 g.) | Melting point 85°–90° C. (from acetic acid-water) | 73.82 | 7.74 | | | 73.96 | 7.85 | | |
| 3 | p-(2-cyclohexenyl)-phenol (5 g.) | CH₃COCH₃ (30 g.) | KOH (14.6 g.) | 7.2 g. [35° C.] | 16 hrs. (reflux) | p-(2-cyclohexenyl)-phenoxyisobutyric acid (5 g.) | Melting point 87°–89° C. | 73.82 | 7.74 | | | 73.92 | 8.01 | | |
| 4 | p-(2-cyclohexenyl)-phenol (10 g.) | CH₃COC₂H₅ (65 g.) | KOH (29.4 g.) | 13.7 g. [35°–40° C.] | 22 hrs. (reflux) | α-[p-(2-cyclohexenyl)-phenoxy]-α-methylbutyric acid (5.3 g.) | Refractive index $n_D^{23.4}$: 1.5340. | 74.42 | 8.08 | | | 74.71 | 8.00 | | |
| 5 | 2-(o-hydroxy-phenyl)-benzothiazole (11.35 g.) | CH₃COCH₃ (60 g.) | KOH (15.9 g.) | 15 g. [35°–45° C.] | 27 hrs. (reflux) | 2-(2'-benzothiazolyl)-phenoxyisobutyric acid (8 g.) | Melting point 106°–108° C. | 65.21 | 4.83 | 4.51 | 10.22 | 65.17 | 4.82 | 4.47 | 10.009 |
| 6 | 2-(o-hydroxyphenyl)-benzothiazole (15 g.) | CH₃COCH₃ (80 g.) | KOH (36.2 g.) | 20 g. [35°–40° C.] | 26 hrs. (reflux) | 4-(2'-benzothiazolyl)-phenoxyisobutyric acid (10.0 g.) | Melting point 190°–192° C. (from benzene) | 65.21 | 4.83 | 4.51 | 10.22 | 65.37 | 4.63 | 4.41 | 9.4 |
| 7 | 2-(o-hydroxyphenyl)-benzothiazole (25 g.) | CH₃COC₂H₅ (150 g.) | KOH (56 g.) | 30 g. [35°–45° C.] | 24 hrs. (reflux) | α-[2-(2'-benzothiazolyl)phenoxyl]-α-methylbutyric acid (20 g.) | Refractive index: $n_D^{22}$: 1.6398. | 66.06 | 5.20 | 4.28 | 9.79 | 66.18 | 5.03 | 4.23 | 9.88 |
| 8 | 2-(o-hydroxyphenyl)-benzoxazole (15 g.) | CH₃COCH₃ (60 g.) | NaOH (16.4 g.) | 10.5 g. [35°–40° C.] | 11.5 hrs. (reflux) | 2-(2'-benzoxazolyl)-phenoxyisobutyric acid (8 g.) | Melting point: 107°–110° C. | 68.67 | 5.08 | 4.71 | | 68.31 | 5.19 | 4.42 | |

TABLE 2

| Example No. | Starting materials | | | | Products | |
|---|---|---|---|---|---|---|
| | Phenoxycarboxylic acid | Alcohol | Benzene | H₂SO₄ | Reaction time (temp.) | Phenoxycarboxylic acid ester | Physical properties |
| 14 | α-[p-(2-cyclopentenyl)-phenoxyl-α-methylbutyric acid (1.5 g.) | 99% ethanol (60 ml.) | | 2 drops | 19 hrs. (reflux) | Ethyl α-[p-(2-cyclopentenyl)]phenoxyl-α-methyl-butyrate (0.8 g.) | Refractive index: $n_D^{24}$: 1.5149 |
| 15 | α-[p-(2-cyclohexenyl)-phenoxyl-α-methylbutyric acid (5 g.) | 99% ethanol (100 ml.) | | 2 drops | 20 hrs. (reflux) | Ethyl α-[p-(2-cyclohexenyl)]phenoxyl-α-methyl-butyrate (3.2 g.) | Refractive index: $n_D^{24}$: 1.5200 |
| 16 | 2-(2'-benzothiazolyl)-phenoxyisobutyric acid (10.5 g.) | 99.5% ethanol (70 ml.) | Benzene (30 ml.) | 3 drops | 12 hrs. (reflux) | Ethyl 2-(2'-benzothiazolyl)phenoxy-isobutyrate (7 g.) | Melting point: 53°–55° C. |
| 17 | 4-(2'-benzothiazolyl)phenoxyisobutyric acid (10 g.) | 99.5% ethanol (100 ml.) | Benzene (2 ml.) | 1 ml | 2 hrs. (reflux) | Ethyl 4-(2'-benzothiazolyl)phenoxy-isobutyrate (8 g.) | Melting point: 119°–120° C. |
| 18 | α-[2-(2'-benzothiazolyl)-phenoxyl-α-methyl-butyric acid (10.5 g.) | 99.5% ethanol (70 ml.) | Benzene (30 ml.) | 3 drops | 6 hrs. (reflux) | Ethyl α-[2-(2'-benzothiazolyl)-phenoxyl-α-methylbutyrate (6.8 g.) | Refractive index: $n_D^{24}$: 1.6155 |

| Example No. | Elementary analysis, percent | | | | | | | |
|---|---|---|---|---|---|---|---|---|
| | Calcd. | | | | Found | | | |
| | C | H | N | S | C | H | N | S |
| 14 | 73.88 | 8.75 | | | 73.66 | 8.56 | | |
| 15 | 75.46 | 8.67 | | | 75.36 | 8.60 | | |
| 16 | 66.86 | 5.57 | 4.11 | 9.38 | 66.55 | 5.61 | 4.40 | 9.44 |
| 17 | 66.86 | 5.57 | 4.11 | 9.38 | 67.03 | 5.52 | 4.14 | 9.17 |
| 18 | 67.61 | 5.92 | 3.94 | 9.01 | 67.37 | 5.87 | 3.76 | 8.88 |

The cholesterol-lowering agents of this invention may be, for example, orally administered. Usually the amount orally administered is 0.01 g.–10 g. per day/human adult, preferably 0.05 g.–3 g. per day/human adult. The cholesterol-lowering agent may be in any suitable form which is conventional for oral administration. Thus, it may be encased in a capsule, or it may be in a liquid form, in a tablet form, or in a powder form. In preparing the agents in these various forms, the active compound may be mixed with or impregnated in a suitable solid carrier.

The cholesterol-lowering activity of the present compounds was tested in mice injected intravenously with 500 mg./kg., of Triton WR 1339 (trademark for oxyethylated tert-octylphenol formaldehyde polymer manufactured by Rohm & Haas Co., U.S.A.). The test compounds were orally administered in a dose of 50 mg./kg. immediately after the injection of Triton solution and 24 hours after the injection, mice were sacrificed for analysis of serum cholesterol. Cholesterol-lowering effect was calculated according to the following equation:

$$\text{Cholesterol-lowering effect (percent)} = \frac{B}{A-B} \times 100$$

where
A = initial serum cholesterol value
B = serum cholesterol value after treatment In Table 3, compounds are referred to by number of the examples.

TABLE 3

| Compounds (No.): | Cholesterol-lowering effect (percent) |
|---|---|
| 1 | 80 |
| 2 | 50 |
| 3 | 40 |
| 4 | 26 |
| 5 | 52 |
| 6 | 41 |
| 7 | 34 |
| 8 | 17 |
| 9 | 35 |
| 10 | 20 |
| 11 | 50 |
| 12 | 41 |
| 13 | 20 |
| 14 | 64 |
| 15 | 60 |
| 16 | 50 |
| 17 | 27 |
| 18 | 36 |
| Clofibrate [1] | 14 |

[1] Generic name for ethyl p-chlorophenoxyisobutyrate.

What is claimed is:
1. Substituted phenoxycarboxylic acid derivatives of the formula,

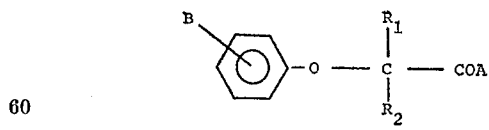

wherein $R_1$ and $R_2$ represent individually hydrogen or $C_1$–$C_4$ alkyl; A represents hydroxyl or $C_1$–$C_4$ alkoxy; and B represents 2-benzothiazolyl or 2-benzoxazolyl, or their pharmaceutically acceptable salts.

2. Substituted phenoxycarboxylic acid derivative of the formula,

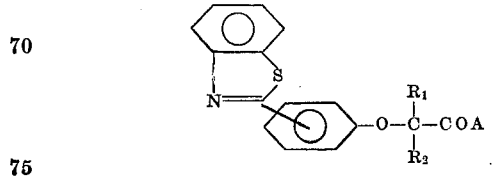

wherein $R_1$ and $R_2$ represent individually methyl or ethyl; and A represents hydroxyl or ethoxy.

3. o-(2-benzothiazolyl)phenoxyisobutyric acid.

4. Ethyl α-[p-(2 - benzothiazolyl)phenoxy]-α-methylbutyrate.

5. Substituted phenoxycarboxylic acid derivatives of the formula

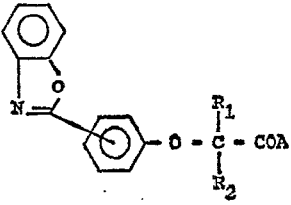

wherein $R_1$ and $R_2$ represent individually methyl or ethyl; and A represents hydroxyl or ethoxy.

6. 2-(2'-benzoxazolyl)phenoxyisobutyric acid.

7. α-[4 - (2' - benzoxazolyl)phenoxy]-α-methylbutyric acid.

References Cited

UNITED STATES PATENTS 3,574,218   4/1971   Hideg et al. _____ 260—304

ALEX MAZEL, Primary Examiner

R. J. GALLAGHER, Assistant Examiner

U.S. Cl. X.R.

260—299, 307 D, 448 R, 473 A, 520; 424—270, 272, 308